(12) United States Patent  (10) Patent No.: US 8,253,820 B2
Shimizu et al.  (45) Date of Patent: Aug. 28, 2012

(54) IMAGE PROCESSING APPARATUS AND IMAGE PROCESSING METHOD

(75) Inventors: Masayoshi Shimizu, Kawasaki (JP); Toru Tsuruta, Kawasaki (JP); Yuushi Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 12/813,880

(22) Filed: Jun. 11, 2010

(65) Prior Publication Data

US 2010/0245615 A1  Sep. 30, 2010

Related U.S. Application Data

(63) Continuation of application No. PCT/JP2008/050078, filed on Jan. 8, 2008.

(51) Int. Cl.
 *H04N 5/235* (2006.01)
(52) U.S. Cl. ............ 348/229.1; 348/236; 348/349; 348/97
(58) Field of Classification Search ............ 348/229.1, 348/254, 255, 362, 364, 234, 236, 349, 97, 348/98, 99
See application file for complete search history.

(56) References Cited

U.S. PATENT DOCUMENTS

| 6,972,800 B2 * | 12/2005 | Sano et al. ............ 348/362 |
| 2002/0048389 A1 | 4/2002 | Komaki |
| 2005/0163372 A1 | 7/2005 | Kida et al. |
| 2005/0226526 A1 | 10/2005 | Mitsunaga |
| 2006/0215044 A1 | 9/2006 | Masuda et al. |
| 2009/0278957 A1 * | 11/2009 | Tanaka ............ 348/229.1 |
| 2010/0225782 A1 * | 9/2010 | Sambongi ............ 348/229.1 |

FOREIGN PATENT DOCUMENTS

| JP | 2000-175149 | 6/2000 |
| JP | 2002-077723 | 3/2002 |
| JP | 2004-221645 | 8/2004 |
| JP | 2005-217574 | 8/2005 |
| JP | 2006-267140 | 10/2006 |

* cited by examiner

*Primary Examiner* — Tuan Ho
(74) *Attorney, Agent, or Firm* — Greer, Burns & Crain, Ltd

(57) ABSTRACT

An image processing apparatus includes a low-frequency-component storage unit that stores therein a low-frequency component generated from a frame in an input moving image composed of a plurality of frames, a low-frequency-component generating unit that generates a low-frequency component from an N-th frame of the input moving image, and stores the low-frequency component in the low-frequency-component storage unit, and a dynamic-range correcting unit that corrects a dynamic range by using an (N+1)-th or later frame of the input moving image and the low-frequency component of the N-th frame stored in the low-frequency-component storage unit.

9 Claims, 11 Drawing Sheets

FIG. 11
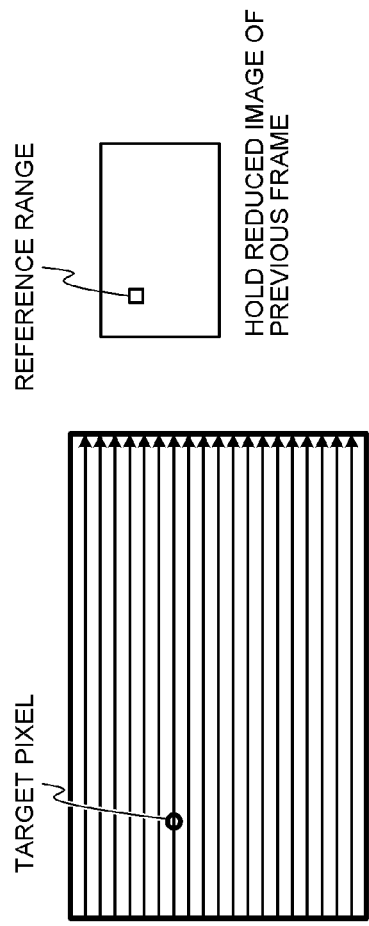
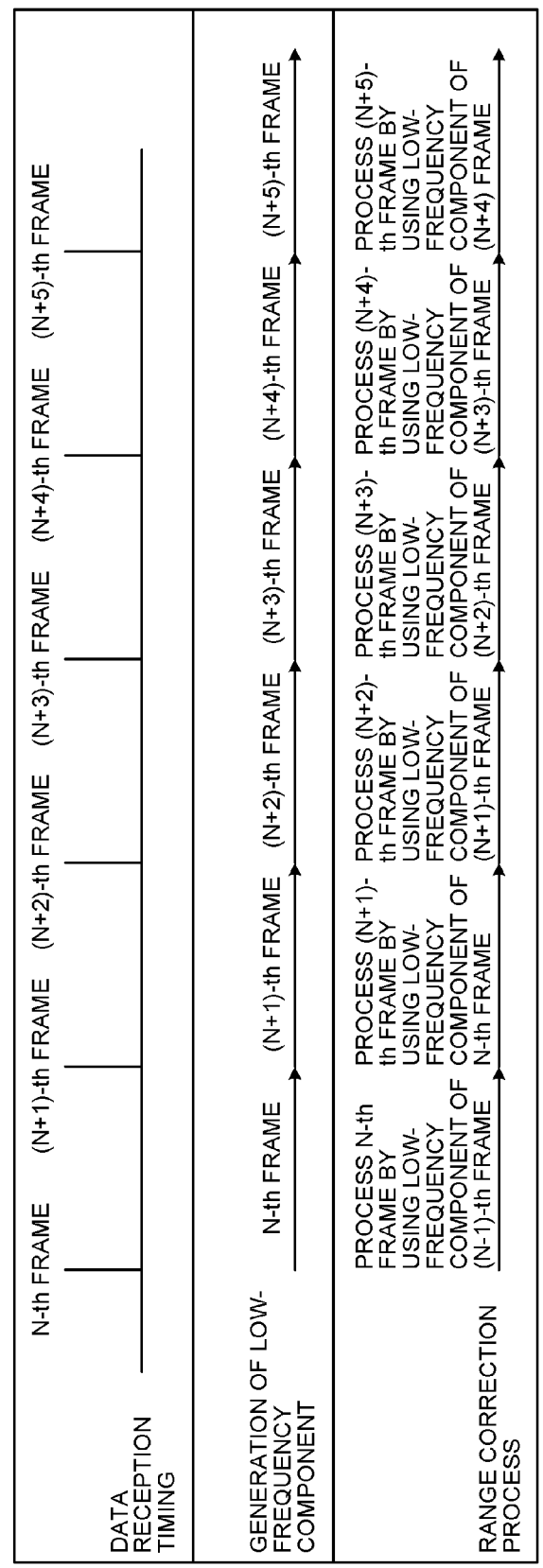

IMAGE PROCESSING APPARATUS AND IMAGE PROCESSING METHOD

CROSS-REFERENCE TO RELATED APPLICATION(S)

This application is a continuation of International Application No. PCT/JP2008/050078, filed on Jan. 8, 2008, the entire contents of which are incorporated herein by reference.

FIELD

The embodiments discussed herein are directed to an image processing apparatus, an image processing method, and an image processing program for correcting the dynamic range by using a low-frequency component generated from an input image.

BACKGROUND

Conventionally, in a process of correcting the dynamic range for reproducing detailed information of input image data, there is an LPF process for generating a low-frequency component of an image with an LPF (Low Pass Filter), which is a filter that allows only a low-frequency signal to pass therethrough. The LPF process for generating a low-frequency component from input image data is hard to improve the processing speed because the LPF is large in filter size and the processing load is heavy.

To cope with this problem, recently, technologies for preventing the processing delay in an LPF process have been disclosed. For example, in a technology disclosed in Japanese Laid-open Patent Publication No. 2004-221645, as illustrated in FIG. 11, by performing a low-frequency-component generating process using a reduced image of a previous frame, the processing load is spread, and the processing delay in an LPF process can be prevented.

Specifically, in the technology disclosed in Japanese Laid-open Patent Publication No. 2004-221645, when image data of the N-th frame is received, a low-frequency component is generated from the received N-th frame, and a dynamic-range correction process of the (N+1)-th frame is performed by using the generated low-frequency component of the N-th frame. Namely, in the technology disclosed in Japanese Laid-open Patent Publication No. 2004-221645, the dynamic-range correction process of the (N+1)-th frame is performed by using the low-frequency component of the N-th frame, and dynamic-range correction of the (N+2)-th frame is performed by using a low-frequency component of the (N+1)-th frame; such a process is repeated.

However, the conventional technology described above has a problem that the processing delay occurs. Specifically, if an LPF process is not completed within a time taken to generate a low-frequency component of a previous frame, the processing delay occurs because a subsequent process cannot be performed until the LPF process is completed.

SUMMARY

According to an aspect of an embodiment of the invention, an image processing apparatus includes: a low-frequency-component storage unit that stores therein a low-frequency component generated from a frame in an input moving image composed of a plurality of frames; a low-frequency-component generating unit that generates a low-frequency component from an N-th frame of the input moving image, and stores the low-frequency component in the low-frequency-component storage unit; and a dynamic-range correcting unit that corrects a dynamic range by using an (N+1)-th or later frame of the input moving image and the low-frequency component of the N-th frame stored in the low-frequency-component storage unit.

According to another aspect of an embodiment of the invention, an image processing method includes: storing a low-frequency component generated from a frame in an input moving image composed of a plurality of frames; generating a low-frequency component from an N-th frame of the input moving image, to store the low-frequency component; and correcting a dynamic range by using an (N+1)-th or later frame of the input moving image and the low-frequency component of the N-th frame stored.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 11 is a diagram for explaining image processing according to a conventional technology.

DESCRIPTION OF EMBODIMENT(S)

Preferred embodiments of the present invention will be explained with reference to accompanying drawings. Incidentally, in what follows, an overview and characteristics of an image processing apparatus according to a first embodiment, and a configuration and a processing flow of the image processing apparatus will be described in this order, and the effect of the first embodiment will be described at the end.

[a] First Embodiment

Overview and characteristics of image processing apparatus

Figure 1:
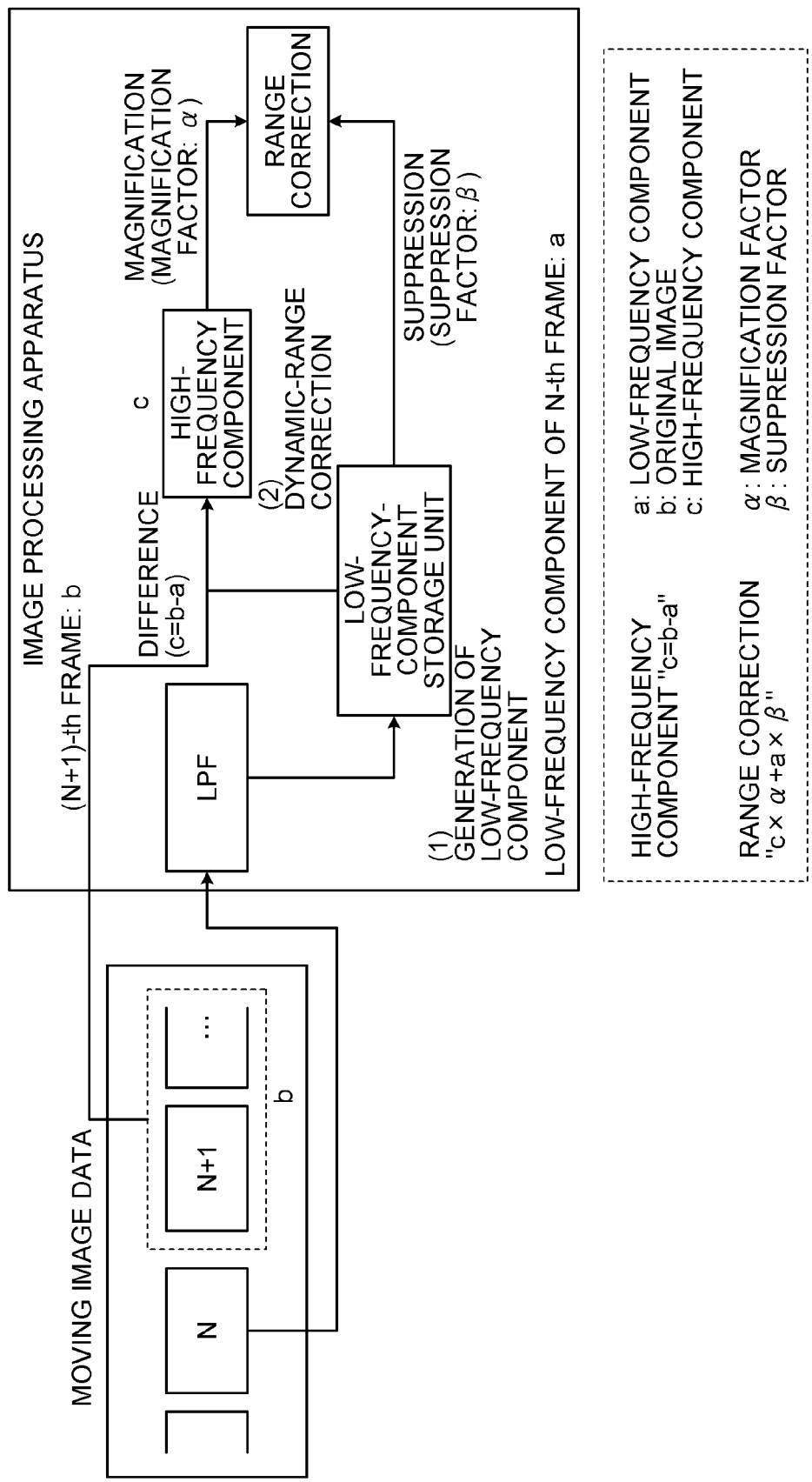
FIG. 1 is a diagram illustrating an overview and characteristics of an image processing apparatus according to a first embodiment.

First, an overview and characteristics of an image processing apparatus according to a first embodiment are described. FIG. 1 is a diagram illustrating the overview and characteristics of the image processing apparatus according to the first embodiment. Incidentally, in FIG. 1, a low-frequency component to be generated is denoted by "a", an original image to be processed is denoted by "b", a high-frequency component is denoted by "c", and a magnification factor and a suppression factor used in dynamic-range correction are denoted by "α" and "β", respectively.

The image processing apparatus is an apparatus to which a frame of a moving image is input at constant time interval, separates the input frame into a low-frequency component and a high-frequency component, and performs a dynamic-range correction process for enhancing the visibility of the moving image by suppressing the low-frequency component and magnifying the high-frequency component.

In such a configuration, an overview of the image processing apparatus is to correct the dynamic range by using a low-frequency component generated from a frame in an input moving image composed of a plurality of frames, and specifically, the image processing apparatus is mainly characterized in that it is possible to reduce the processing load and also possible to prevent the processing delay.

To explain the main characteristics, the image processing apparatus generates a low-frequency component from the N-th frame of the input moving image, and stores the generated low-frequency component in a low-frequency-component storage unit ((1) in FIG. 1). To give an example specifically, when a moving image composed of a plurality of frames is input from outside to the image processing apparatus, the image processing apparatus generates a low-frequency component from the N-th frame of the input moving image through an LPF, and stores the generated low-frequency component "a" of the N-th frame in the low-frequency-component storage unit.

Then, the image processing apparatus corrects the dynamic range by using the (N+1)-th or later frame of the input moving image and the low-frequency component of the N-th frame stored in the low-frequency-component storage unit (see (2) in FIG. 1).

To explain specifically with the example described above, the image processing apparatus generates a high-frequency component "c" from a difference "c=b−a" between the (N+1)-th frame "b" of the input moving image, which is an original image to be processed, and the low-frequency component "a" of the N-th frame stored in the low-frequency-component storage unit. Then, the image processing apparatus performs a dynamic-range correction process "c×α+a×β" for enhancing the visibility of the moving image by suppressing the low-frequency component "a" of the N-th frame (a suppression factor: β) and magnifying the high-frequency component "c" (a magnification factor: α). As for the (N+2)-th and later frames, in the same way as described above, the image processing apparatus performs a dynamic-range correction process of each of the (N+2)-th and later frames by using the low-frequency component generated from the N-th frame. Incidentally, the (N+1)-th and later frames are frames to be processed, which compose the moving frame input from outside, such as the (N+1)-th frame and the (N+2)-th frame.

Figure 2:
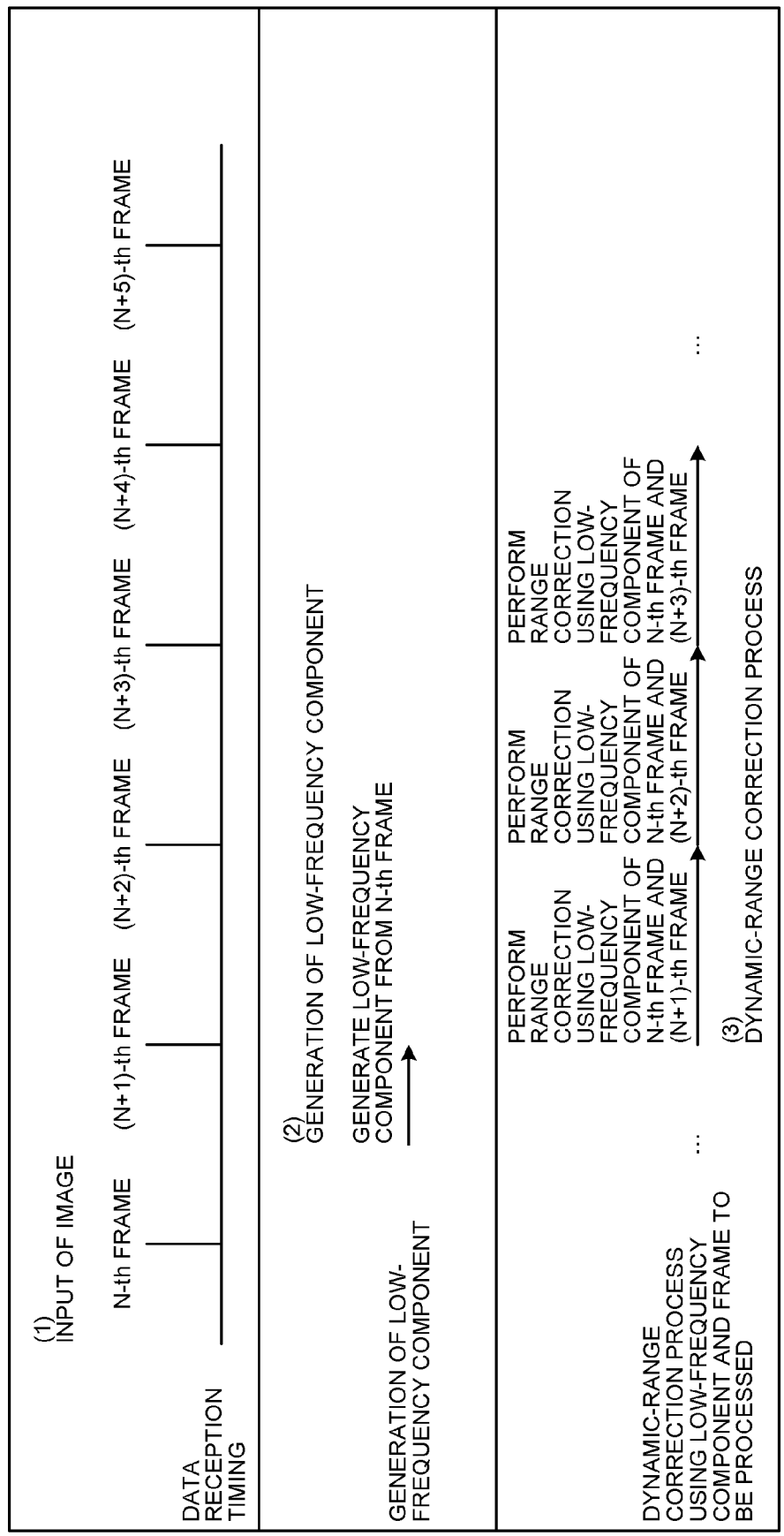
FIG. 2 is a diagram for explaining a timing chart of a dynamic-range correction process according to the first embodiment.

As an example, the case of dynamic-range correction of the (N+1)-th frame using the low-frequency component of the N-th frame explained in FIG. 1 is explained in detail with a timing chart. FIG. 2 is a diagram for explaining the timing chart of the dynamic-range correction process according to the first embodiment.

Timing chart of dynamic-range correction process

As illustrated in FIG. 2, when the N-th frame of a moving image is input from outside (see (1) in FIG. 2), the image processing apparatus generates a low-frequency component from the input N-th frame of the moving image (see (2) in FIG. 2). Then, when the (N+1)-th frame, an image to be processed, is input from outside, the image processing apparatus performs a dynamic-range correction process by using the input (N+1)-th frame and the generated low-frequency component of the N-th frame (see (3) in FIG. 2).

Subsequently, when the (N+2)-th frame, an image to be processed, is input from outside, the image processing apparatus performs a dynamic-range correction process by using the input (N+2)-th frame and the generated low-frequency component of the N-th frame. After that, when the (N+3)-th frame, an image to be processed, is input from outside, the image processing apparatus performs a dynamic-range correction process by using the input (N+3)-th frame and the generated low-frequency component of the N-th frame.

Namely, when performing respective dynamic-range corrections of the (N+1)-th frame, the (N+2)-th frame, and the like, the image processing apparatus performs a dynamic-range correction process of each of the (N+1)-th frame, the (N+2)-th frame, and the like which are images to be processed by using the low-frequency component generated from the N-th frame. Thus, unlike the conventional technology, in the image processing apparatus, there is no delay in subsequent processing, which is caused in the conventional technology because a process of generating a low-frequency component of a previous frame is not completed.

In this manner, the image processing apparatus according to the first embodiment can correct the respective dynamic ranges of a plurality of frames by using a low-frequency component generated from one frame; as a result, as explained above as the main characteristics, it is possible to reduce the processing load, and also possible to prevent the processing delay.

Configuration of Image Processing Apparatus

Figure 3:
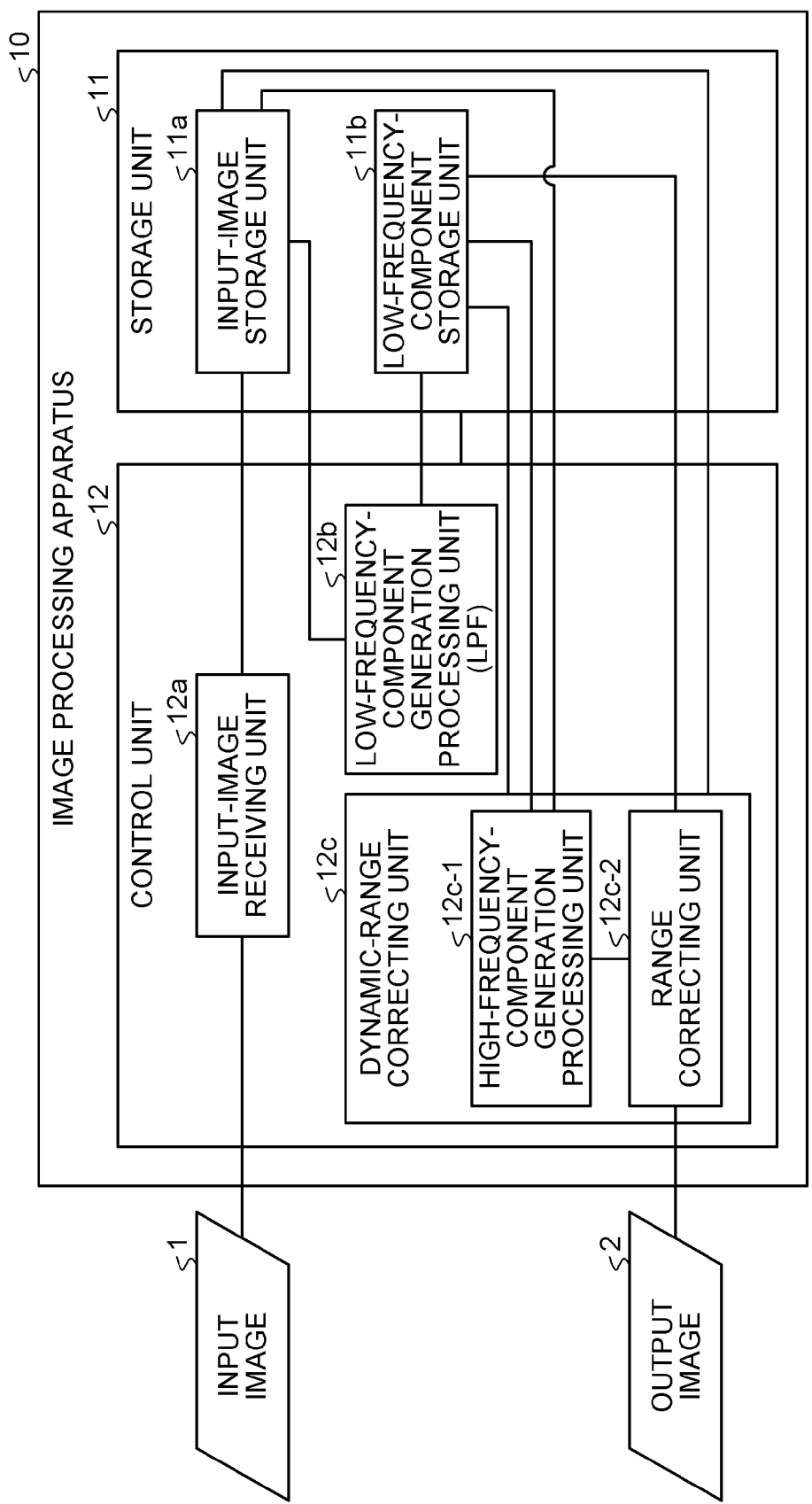
FIG. 3 is a block diagram illustrating a configuration of the image processing apparatus according to the first embodiment.

Subsequently, a configuration of the image processing apparatus according to the first embodiment is explained with reference to FIG. 3. FIG. 3 is a block diagram illustrating the configuration of the image processing apparatus according to the first embodiment. As illustrated in FIG. 3, an image processing apparatus 10 is composed of a storage unit 11 and a control unit 12, and generates a low-frequency component from an input image 1, which is one of a plurality of frames of an input moving image, and then outputs an output image 2 after performing a dynamic-range correction process.

The storage unit 11 stores therein data required for various processes by the control unit 12 and respective processing results by the control unit 12, and particularly, includes an input-image storage unit 11a and a low-frequency-component storage unit 11b as units closely associated with the present invention.

The input-image storage unit 11a stores therein frames of a moving image input from outside to the image processing apparatus 10. The low-frequency-component storage unit 11b stores therein a low-frequency component generated by a low-frequency-component generation processing unit 12b to be described below.

The control unit 12 has an internal memory for storing a control program, programs defining procedures of various processes, and required data, and particularly, includes an input-image receiving unit 12a, the low-frequency-component generation processing unit 12b, and a dynamic-range correcting unit 12c as units closely associated with the present invention, and these units execute various processes.

The input-image receiving unit 12a receives an input image, i.e., a frame of a moving image input from outside to the image processing apparatus 10. To give an example specifically, when the input image 1, which is the N-th frame of the moving image input from outside to the image processing apparatus 10, is input, the input-image receiving unit 12a stores the input image 1 in the input-image storage unit 11a. Incidentally, frames of a moving image input from outside can be received not only via an external network but also from a storage medium, such as a CD-ROM.

The low-frequency-component generation processing unit 12b generates a low-frequency component from the N-th frame of the input moving image, and stores the low-frequency component of the N-th frame in the low-frequency-component storage unit 11b. To explain specifically with the example described above, the low-frequency-component generation processing unit 12b acquires the N-th frame of the moving image received by the input-image receiving unit 12a from the input-image storage unit 11a. Then, the low-frequency-component generation processing unit 12b generates a low-frequency component from the acquired N-th frame, and stores the generated low-frequency component "a" of the N-th frame in the low-frequency-component storage unit 11b.

The dynamic-range correcting unit 12c corrects the dynamic range by using the (N+1)-th or later frame of the input moving image and the low-frequency component stored in the low-frequency-component storage unit 11b by the low-frequency-component generation processing unit 12b, and particularly, includes a high-frequency-component generation processing unit 12c-1 and a range correcting unit 12c-2 as units associated with the present invention.

The high-frequency-component generation processing unit 12c-1 generates a high-frequency component by using the (N+1)-th or later frame of the input moving image and the low-frequency component stored in the low-frequency-component storage unit 11b by the low-frequency-component generation processing unit 12b. The range correcting unit 12c-2 corrects the dynamic range by using the high-frequency component generated by the high-frequency-component generation processing unit 12c-1 and the low-frequency component stored in the low-frequency-component storage unit 11b by the low-frequency-component generation processing unit 12b.

To explain specifically with the example described above, the high-frequency-component generation processing unit 12c-1 generates a high-frequency component "c" from a difference "c=b−a" between the (N+1)-th frame "b" of the received moving image, which is an original image to be processed, and the low-frequency component "a" stored in the low-frequency-component storage unit 11b by the low-frequency-component generation processing unit 12b. Then, the range correcting unit 12c-2 outputs, as an output image 2, a result of a dynamic-range correction process "=c×α+a×β" for enhancing the visibility of the moving image by suppressing the low-frequency component "a" of the N-th frame (a suppression factor: β) and magnifying the high-frequency component "c" (a magnification factor: α).

Process performed by image processing apparatus according to first embodiment

Figure 4:
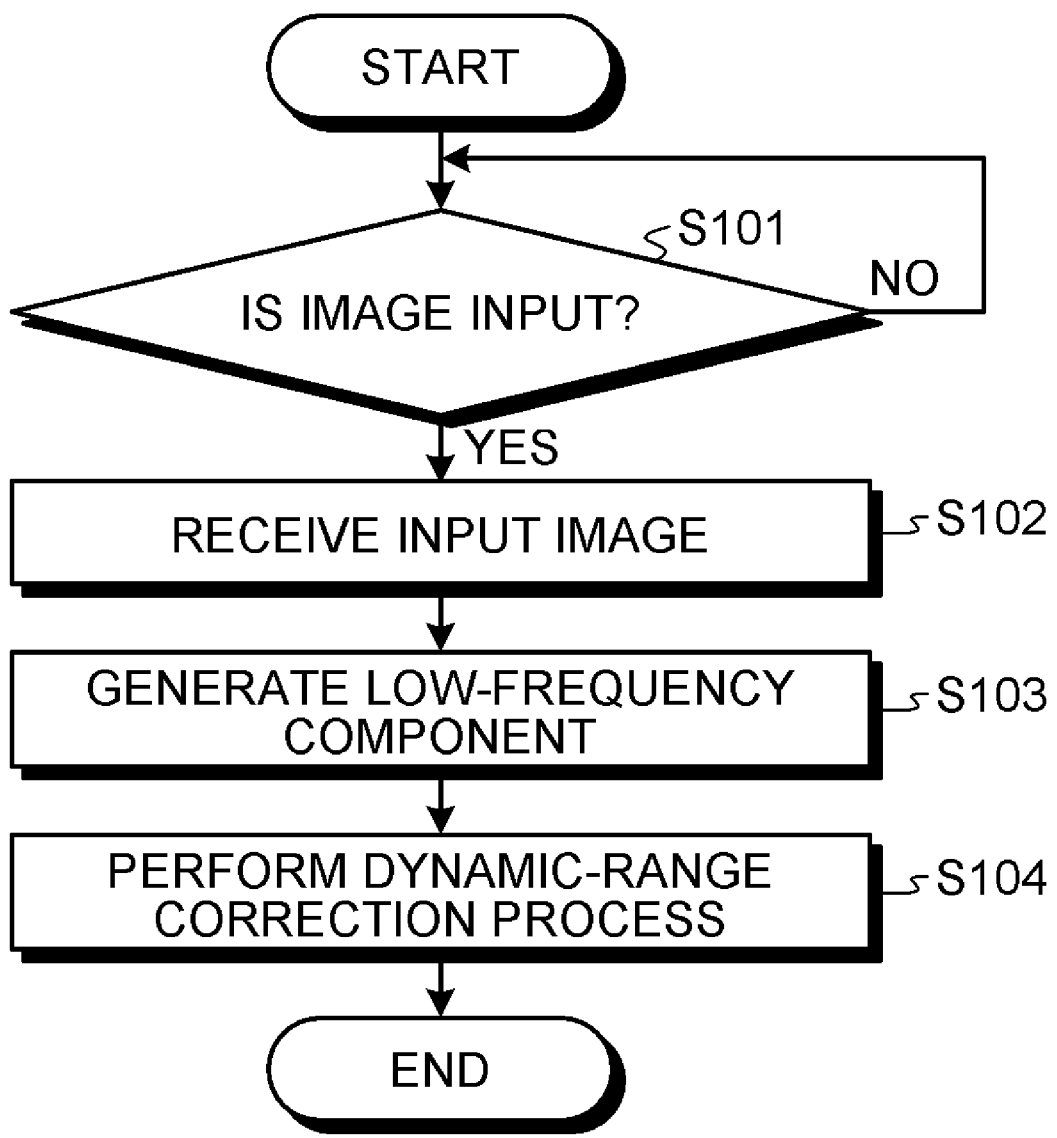
FIG. 4 is a flowchart illustrating the dynamic-range correction process performed by the image processing apparatus according to the first embodiment.

A dynamic-range correction process performed by the image processing apparatus 10 according to the first embodiment will be explained with reference to FIG. 4. FIG. 4 is a flowchart illustrating the dynamic-range correction process performed by the image processing apparatus 10 according to the first embodiment.

As illustrated in FIG. 4, when a frame of a moving image is input from outside to the image processing apparatus 10 (YES at Step S101), the input-image receiving unit 12a receives an input image input from outside to the image processing apparatus 10 (Step S102). To give an example specifically, the input-image receiving unit 12a receives the input image 1, which is the N-th frame of the moving image input from outside to the image processing apparatus 10. Then, the input-image receiving unit 12a stores the received input image 1 in the input-image storage unit 11a.

Then, the low-frequency-component generation processing unit 12b generates a low-frequency component from the N-th frame of the input moving image, and stores the low-frequency component in the low-frequency-component storage unit 11b (Step S103). To explain specifically with the example described above, the low-frequency-component generation processing unit 12b acquires the N-th frame of the moving image received by the input-image receiving unit 12a from the input-image storage unit 11a, and generates a low-frequency component from the acquired N-th frame, and then stores the generated low-frequency component of the N-th frame in the low-frequency-component storage unit 11b.

After that, the dynamic-range correcting unit 12c corrects the dynamic range by using the (N+1)-th or later frame of the input moving image and the low-frequency component stored in the low-frequency-component storage unit 11b by the low-frequency-component generation processing unit 12b (Step S104). To explain specifically with the example described above, the dynamic-range correcting unit 12c generates a high-frequency component of the (N+1)-th frame by using the (N+1)-th frame of the input moving image and the low-frequency component stored in the low-frequency-component storage unit 11b by the low-frequency-component generation processing unit 12b, and performs a process of correcting the dynamic range of the (N+1)-th frame by magnifying the generated high-frequency component of the (N+1)-th frame and suppressing the low-frequency component of the N-th frame.

Effects of First Embodiment

In this manner, the image processing apparatus 10 stores a low-frequency component generated from a frame of an input moving image, generates a low-frequency component from the N-th frame of the input moving image, stores the low-frequency component generated from the N-th frame in a predetermined storage unit, and corrects the dynamic range by using the (N+1)-th or later frame of the input moving image and the low-frequency component of the N-th frame stored in the predetermined storage unit; thus, it is possible to reduce the processing load, and also possible to prevent the processing delay.

For example, when correcting the dynamic range by using a low-frequency component generated from a frame in an input moving image composed of a plurality of frames, the image processing apparatus 10 uses a low-frequency component generated from the N-th frame of the moving image input from outside to the image processing apparatus 10 for the correction of the dynamic ranges of the (N+1)-th and later frames, such as the (N+1)-th frame and the (N+2)-th frame, so as compared with the case where a low-frequency component is generated from each of all the input frames, it is possible to reduce the processing load, and also possible to prevent the processing delay.

Furthermore, in the case of generation of a low-frequency component, it is described that the image processing apparatus 10 generates a low-frequency component while image data of one frame is input; however, the present invention is not limited to this, and a low-frequency component can be generated over a period of time taken for image data of a plurality of frames to be input.

Figure 5:
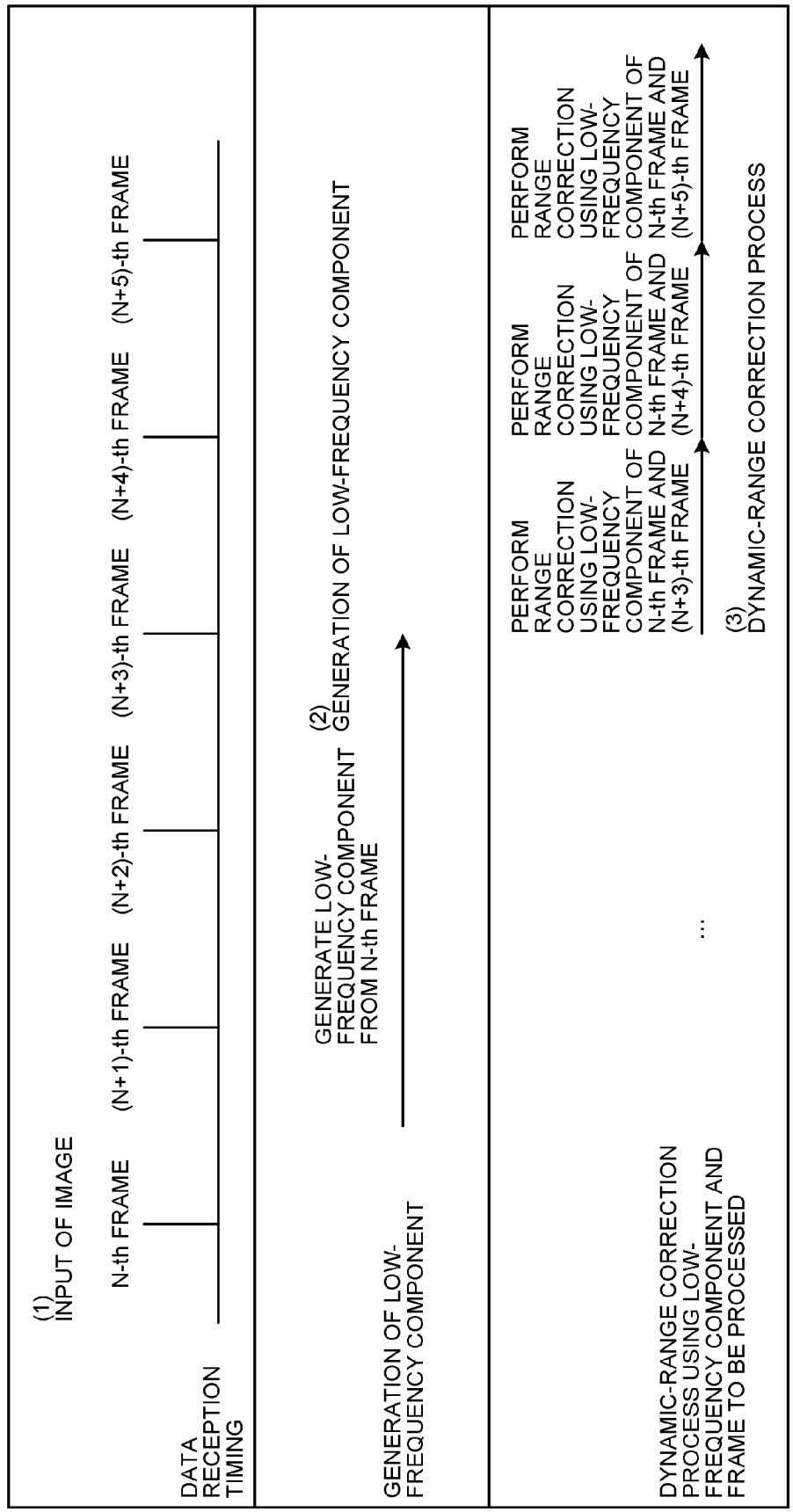
FIG. 5 is a diagram for explaining a period of time taken for the image processing apparatus to generate a low-frequency component.

To give an example specifically, as illustrated in FIG. 5, when receiving the N-th frame of a moving image from outside (see (1) in FIG. 5), the image processing apparatus 10 generates a low-frequency component of the received N-th frame while the image processing apparatus 10 receives the (N+3)-th frame by distributing the load (see (2) in FIG. 5).

Then, the image processing apparatus 10 generates a high-frequency component of the (N+3)-th frame by using the input (N+3)-th frame and the generated low-frequency component of the N-th frame, and performs a process of correcting the dynamic range of the (N+3)-th frame by magnifying the generated high-frequency component of the (N+3)-th frame and suppressing the generated low-frequency component of the N-th frame (see (3) in FIG. 5). Furthermore, in the same manner as to the (N+3)-th frame, the image processing apparatus 10 performs the dynamic-range correction process of the (N+4)-th frame, the (N+5)-th frame, and the like by using the low-frequency component of the N-th frame. In this manner, the image processing apparatus 10 generates a low-frequency component over a period of time taken for image data of a plurality of frames to be input, so it is possible to distribute the processing load. FIG. 5 is a diagram for explaining a period of time taken for the image processing apparatus 10 to generate a low-frequency component.

[b] Second Embodiment

In the first embodiment, there is described the case where a moving image is input from outside to the image processing apparatus 10 in real time; however, the present invention is not limited to this, and frames of a moving image input from outside to the image processing apparatus 10 can be accumulated and then processed.

Configuration of image processing apparatus according to second embodiment

Figure 6:
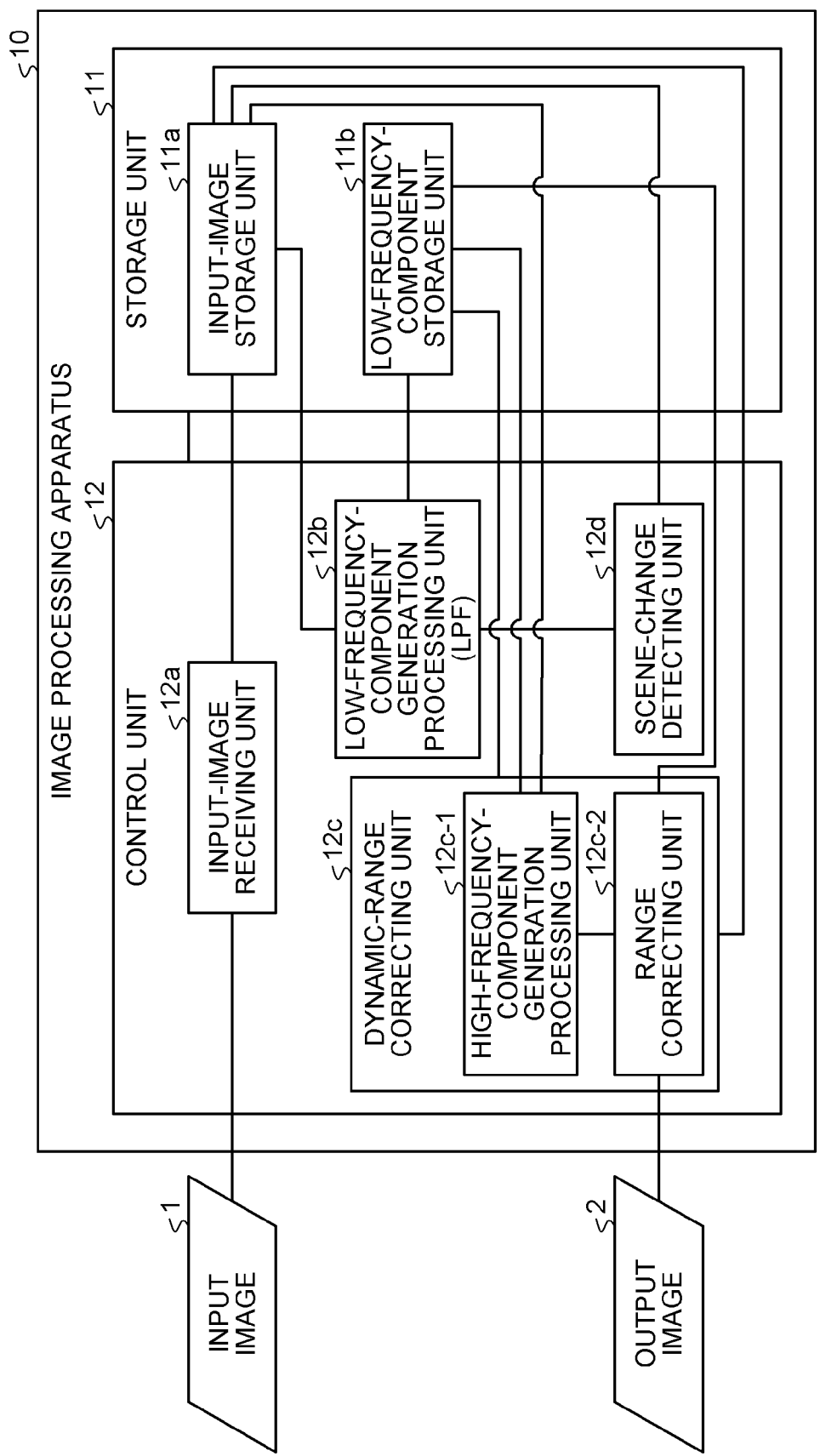
FIG. 6 is a block diagram illustrating a configuration of an image processing apparatus according to a second embodiment.
Figure 7:
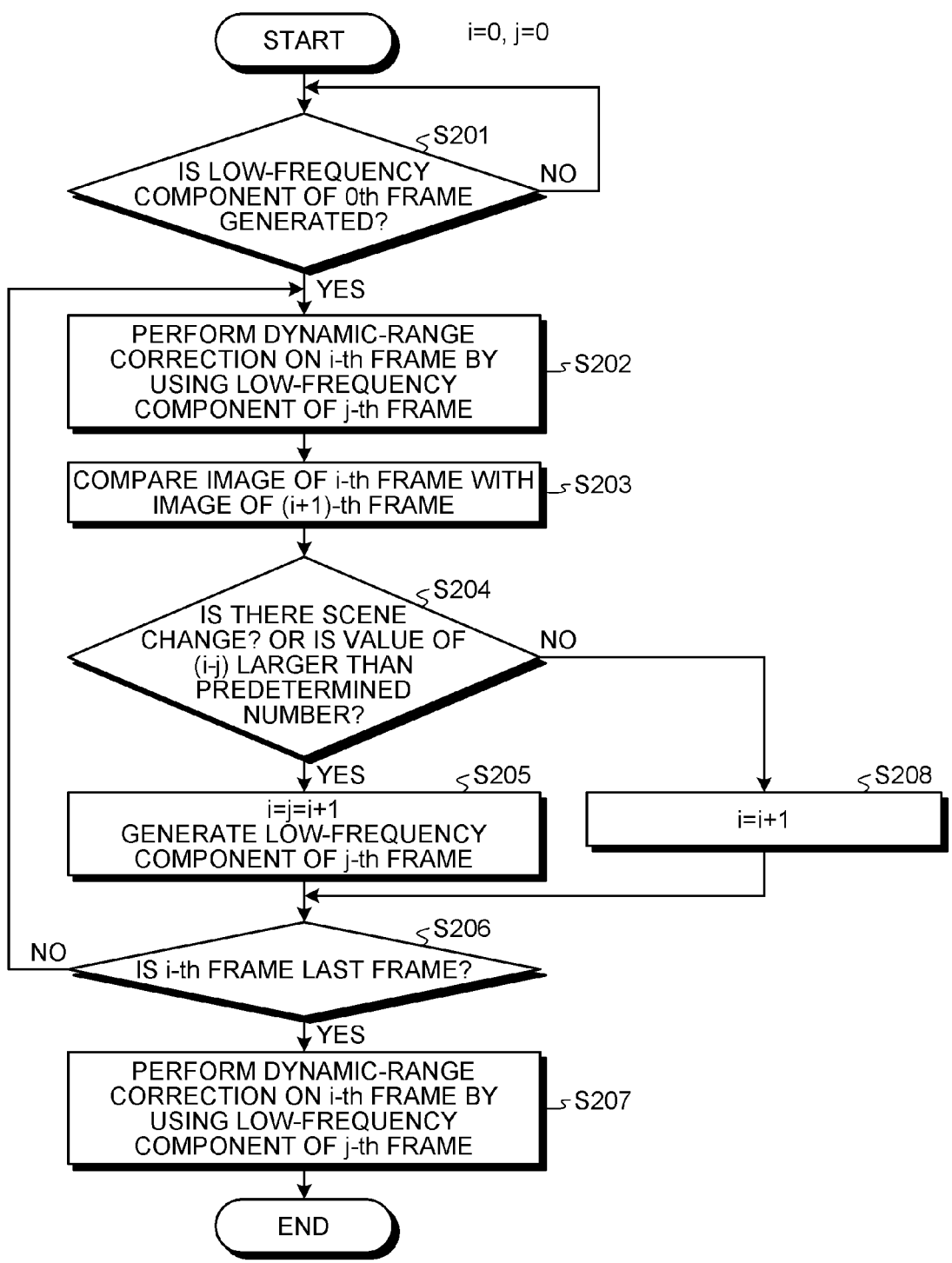
FIG. 7 is a flowchart illustrating a dynamic-range correction process performed by the image processing apparatus according to the second embodiment.

In a second embodiment below, with reference to FIGS. 6 and 7, there is described the case where frames of a moving image input from outside to the image processing apparatus 10 are accumulated and then processed. FIG. 6 is a block diagram illustrating a configuration of an image processing apparatus according to the second embodiment, and FIG. 7 is a flowchart illustrating a dynamic-range correction process performed by the image processing apparatus 10 according to the second embodiment.

The low-frequency-component storage unit 11b, the input-image receiving unit 12a, the low-frequency-component generation processing unit 12b, and the dynamic-range correcting unit 12c illustrated in FIG. 6 have the same function as those illustrated in FIG. 3 in the first embodiment, respectively. The input-image storage unit 11a having a different function from that in the first embodiment and a scene-change detecting unit 12d are explained here.

The input-image storage unit 11a stores therein frames of an input moving image. For example, the input-image storage unit 11a stores therein frames of an input moving image, such as the N-th frame, the (N+1)-th frame, and the (N+2)-th frame, in an accumulating way.

The scene-change detecting unit 12d compares a frame from which a low-frequency component is generated out of the frames of the input moving image stored in the input-image storage unit 11a with each of subsequent frames stored in the input-image storage unit 11a, which follow the frame from which the low-frequency component is generated, and if detects a scene change between the frames, notifies the low-frequency-component generation processing unit 12b of the detection of the scene change.

To explain specifically with an example, the scene-change detecting unit 12d calculates the sum of absolute values of pixel-by-pixel differences between the frame from which the low-frequency component is generated out of the frames of the input moving image and each of the subsequent frames. Then, if the calculated sum of the absolute values exceeds a predetermined threshold, the scene-change detecting unit 12d notifies the low-frequency-component generation processing unit 12b of the occurrence of a scene change. Incidentally, when a scene change is detected by the scene-change detecting unit 12d, the low-frequency-component generation processing unit 12b generates a low-frequency component from a frame in which the scene change occurs.

Dynamic-range correction process performed by image processing apparatus according to second embodiment In the flowchart illustrating the dynamic-range correction process performed by the image processing apparatus 10 according to the second embodiment, a variable "i" illustrated in FIG. 7 denotes a low-frequency component generated from a frame before a scene change by the low-frequency-component generation processing unit 12b, and a variable "j" denotes a frame subsequent to the frame. If a scene change occurs in the j-th frame, as described above, a low-frequency component of the j-th frame is generated; such a process is repeatedly performed on up to the last frame. The frames of the input moving image are stored in the input-image storage unit 11a in an accumulating way.

In such a configuration, when a low-frequency component of the 0th frame is generated (YES at Step S201), the image processing apparatus 10 performs dynamic-range correction on the i-th frame by using a low-frequency component of the j-th frame (Step S202). To explain specifically with an example, in the same manner as in the first embodiment, when generating a low-frequency component of the 0th frame, the image processing apparatus 10 performs dynamic-range correction by using the low-frequency component of the 0th frame.

Then, the image processing apparatus 10 compares an image of the i-th frame with an image of the (i+1)-th frame (Step S203), and if there is a scene change between the frames, or if a value of (i-j) is larger than a predetermined number (YES at Step S204), with the variables set as "i=j=i+1" (Step S205), the image processing apparatus 10 generates a low-frequency component of the j-th frame.

To explain specifically with the example described above, the image processing apparatus 10 calculates the sum of absolute values of pixel-by-pixel differences between input images of two frames, the 0th frame (the i-th frame) and the 1st frame (the (i+1)-th frame), to determine whether a scene change occurs between the two frames. If the calculated sum of the absolute values exceeds a predetermined threshold, the image processing apparatus 10 determines that a scene change occurs in the 1st frame (the (i+1)-th frame). Subsequently, if a value of (i−j), the number of times of comparison for detection of a scene change, is larger than a preset given number (for example, "2", etc.), or if it is determined that a scene change occurs in the 1st frame (the (i+1)-th frame), with the variables set as "i=j=i+1", the image processing apparatus 10 generates a low-frequency component of the 1st frame (the j-th frame) in which the scene change occurs.

Subsequently, if the i-th frame is the last frame (YES at Step S206), the image processing apparatus 10 performs dynamic-range correction on the i-th frame by using the low-frequency component of the j-th frame (Step S207). To explain specifically with the example described above, if the 1st frame (the i-th frame) is the last frame, the image processing apparatus 10 performs dynamic-range correction on the 1st frame (the i-th frame) by using the low-frequency component of the 1st frame (the j-th frame).

Furthermore, at Step S204, if there is no scene change, and also a value of (i−j), the number of times of comparison for detection of a scene change, is equal to or smaller than the preset given number (for example, "2", etc.) (NO at Step S204), with the variable "i" set as "i=i+1" (Step S208), the image processing apparatus 10 does not newly generate a low-frequency component. Moreover, at Step S206, if the i-th frame is not the last frame (NO at Step S206), the image processing apparatus 10 performs the process on a subsequent frame.

The case where a scene change occurs in the 3rd frame is described here. For example, at Step S204, if a scene change does not occur between the 0th frame and the 1st frame, the image processing apparatus 10 sets the 2nd frame as a frame to be compared at Step S208. Then, at Step S202, the image processing apparatus 10 corrects the dynamic range of the 1st frame by using the low-frequency component of the 0th frame. Subsequently, at Step S204, if a scene change does not occur between the 1st frame and the 2nd frame, in the same manner as described above, the image processing apparatus 10 sets the 3rd frame as a frame to be compared at Step S208. After that, at Step S202, the image processing apparatus 10 corrects the dynamic range of the 2nd frame by using the low-frequency component of the 0th frame. Then, at Step S204, if a scene change occurs between the 2nd frame and the 3rd frame, the image processing apparatus 10 generates a low-frequency component of the 3rd frame. In this manner, the image processing apparatus 10 repeatedly performs the above process on up to the last frame, and when it comes to the last frame, the image processing apparatus 10 corrects the dynamic range of the last frame, and then terminates the process.

Namely, the image processing apparatus 10 according to the second embodiment generates a low-frequency component when a scene change occurs, and further newly generates a low-frequency component when the number of times of comparison for detection of a scene change exceeds a preset given number even if a scene change does not occur. Furthermore, the image processing apparatus 10 always performs dynamic-range correction by using the latest low-frequency component.

Effects of Second Embodiment

In this manner, the image processing apparatus 10 according to the second embodiment corrects the dynamic range of a frame to be processed by using the latest low-frequency component, and therefore can correct the dynamic range without influence from the image quality before a scene change. Furthermore, the image processing apparatus 10 according to the second embodiment newly generates a low-frequency component when the number of times of comparison for detection of a scene change exceeds a preset given number, and therefore can newly generate a low-frequency component in response to a change that cannot be recognized based on only a numerical value for determining whether there is a scene change, such as absolute values of pixel-by-pixel differences.

[c] Third Embodiment

In the second embodiment, it is described that if a scene change occurs, or if the number of times of comparison for detection of a scene change reaches a given number, a low-frequency component is generated, and the dynamic range is corrected; however, the present invention is not limited to this, and the dynamic range can be corrected in such a manner that if a scene change occurs, a low-frequency component is generated from a frame in which the scene change occurs, and as for a frame from which a low-frequency component is not generated, a low-frequency component is generated by linear interpolation, and the dynamic range is corrected.

Figure 8:
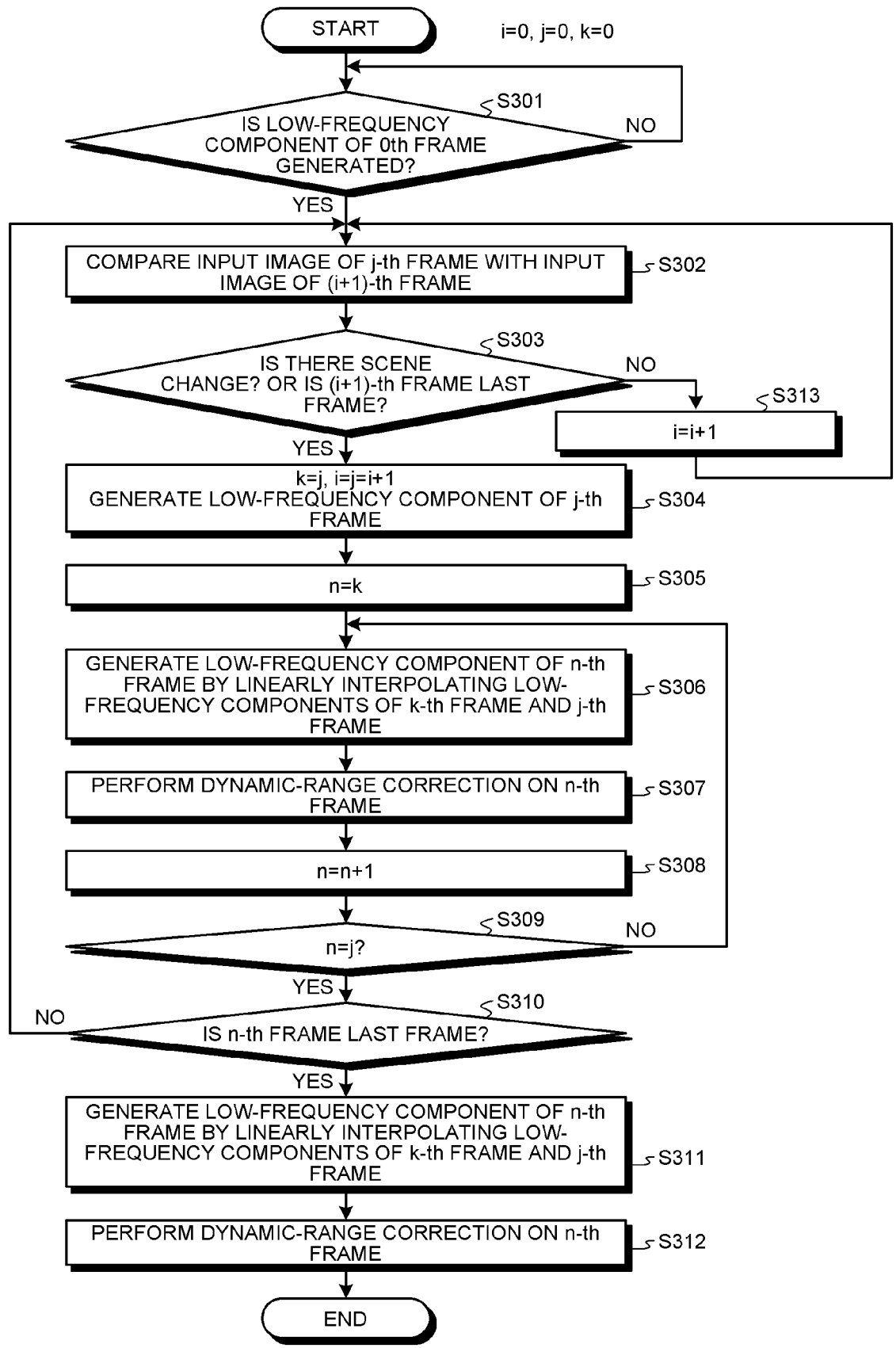
FIG. 8 is a flowchart illustrating a dynamic-range correction process performed by an image processing apparatus according to a third embodiment.

Dynamic-range correction process performed by image processing apparatus according to third embodiment In a third embodiment below, with reference to FIG. 8, there is described the case where a low-frequency component is generated only if a scene change occurs, and as for a frame from which a low-frequency component is not generated, a low-frequency component is generated by linear interpolation. FIG. 8 is a flowchart illustrating a dynamic-range correction process performed by the image processing apparatus 10 according to the third embodiment.

As illustrated in FIG. 8, when generating a low-frequency component of the 0th frame (YES at Step S301), the image processing apparatus 10 compares an input image of the j-th frame with an input image of the (i+1)-th frame (Step S302). To explain specifically with an example, in the same manner as in the first embodiment, when generating a low-frequency component of the 0th frame, the image processing apparatus 10 calculates the sum of absolute values of pixel-by-pixel differences between input images of two frames, the 0th frame (the j-th frame) and the 1st frame (the (i+1)-th frame) to determine whether a scene change occurs.

Then, if there is a scene change, or if the (i+1)-th frame is the last frame (YES at Step S303), with the variables set as "k=j" and "i=j=i+1", the image processing apparatus 10 generates a low-frequency component of the j-th frame (Step S304).

To explain specifically with the example described above, if there is a scene change between the 0th frame and the 1st frame, or if the 1st frame (the (i+1)-th frame) is the last frame, with the variables set as "k=j" and "i=j=i+1", the image processing apparatus 10 generates a low-frequency component of the 1st frame (the j-th frame in which the scene change occurs.

Subsequently, with the variables set as "n=k" (Step S305), the image processing apparatus 10 linearly interpolates the low-frequency components of the k-th frame and the j-th frame, and generates a low-frequency component of the n-th frame (Step S306), and then performs dynamic-range correction by using the generated low-frequency component of the n-th frame (Step S307).

To explain specifically with the example described above, with the variables set as "n=k", using the 0th frame (the k-th frame) before the scene change and the 1st frame (the j-th frame) after the scene change, the image processing apparatus 10 generates a low-frequency component of a frame (the n-th frame) between the frame before the scene change and the frame after the scene change by linear interpolation. In this example, the frame before the scene change and the frame after the scene change are the 0th frame and the 1st frame, so the n-th frame does not exist; however, for example, if the scene change occurs in not the 1st frame but the 3rd frame, a low-frequency component of the 1st frame and the 2nd frame is generated by linearly interpolating the low-frequency components of the 0th frame and the 3rd frame. Then, the image processing apparatus 10 performs dynamic-range correction by using the generated low-frequency component of the n-th frame (the frame of which the low-frequency component is generated by the linear interpolation).

After that, with the variable set as "n=n+1" (Step S308), if n=j (YES at Step S309), the image processing apparatus 10 determines whether the n-th frame is the last frame (Step S310). If the n-th frame is the last frame (YES at Step S310), the image processing apparatus 10 generates a low-frequency component of the n-th frame by linearly interpolating the low-frequency components of the k-th frame and the j-th frame (Step S311), and performs dynamic-range correction by using the generated low-frequency component of the n-th frame (Step S312).

To explain specifically with the example described above, with the variable set as "n=n+1", when generating a low-frequency component of a frame between the frame before the scene change and the frame after the scene change (n=j), the image processing apparatus 10 determines whether the n-th frame is the last frame of the moving image input from outside. If the n-th frame is the last frame, the image processing apparatus 10 generates a low-frequency component of the n-th frame by linearly interpolating the low-frequency components of the k-th frame and the j-th frame. Subsequently, the image processing apparatus 10 performs dynamic-range correction by using the generated low-frequency component of the n-th frame.

Furthermore, at Step S303, if there is no scene change, and the (i+1)-th frame is not the last frame (NO at Step S303), with the variable set as "i=i+1" (Step S313), the image processing apparatus 10 compares the input image of the j-th frame with an input image of a subsequent frame. Moreover, at Step S309, if a low-frequency component of frame(s) before the frame in which the scene change occurs or the last frame is not generated (NO at Step S309), the image processing apparatus 10 repeatedly performs the process of generating a low-frequency component. Furthermore, at Step S310, if the n-th frame is not the last frame (NO at Step S310), the image processing apparatus 10 performs the process on a frame subsequent to the frame in which the scene change occurs.

Namely, the image processing apparatus 10 according to the third embodiment generates a low-frequency component only if a scene change occurs. And, as for a frame of which the low-frequency component is not generated because no scene change occurs therein, a low-frequency component is generated by linear interpolation.

In this manner, since the image processing apparatus 10 according to the third embodiment does not generate a low-frequency component until a scene change occurs, it is possible to reduce the processing load; furthermore, as for a frame of which the low-frequency component is not generated, a low-frequency component is generated by linear interpolation, so it is possible to enhance the resolution of an image.

Moreover, in the above third embodiment, there is described the case where a low-frequency component is generate by linear interpolation; however, the present invention is not limited to this, and a low-frequency component can be generated by using the closest frame without performing the linear interpolation or the like.

[d] Fourth Embodiment

In the first embodiment, it is described that the dynamic ranges of the (N+1)-th and later frames are corrected by using the low-frequency component generated from the N-th frame; however, the present invention is not limited to this, and the dynamic range can be corrected in such a manner that with a plurality of (discretized) LPFs, using a result of the multilevel LPFs of the N-th frame, the result of the multilevel LPFs of the N-th frame and the (N+1)-th or later frame are synthesized thereby generating a final result of the LPFs, and the dynamic range is corrected by using the final result of the LPFs.

Figure 9:
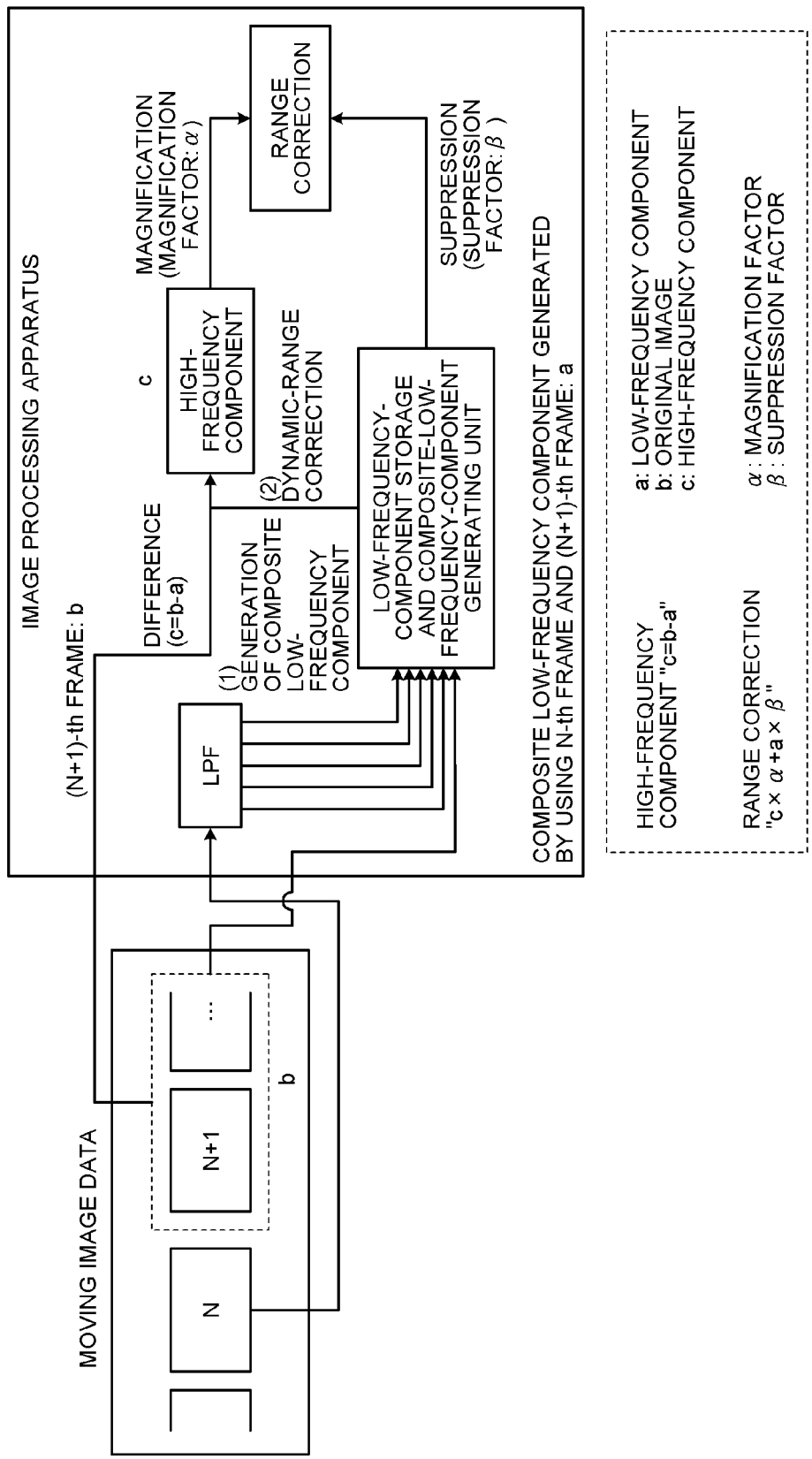
FIG. 9 is a diagram for explaining a dynamic-range correction process performed by an image processing apparatus according to a fourth embodiment.

Dynamic-range correction process performed by image processing apparatus according to fourth embodiment In a fourth embodiment below, with reference to FIG. 9, there is described the case where a final result of the LPFs is generated by synthesis of a result of the multilevel LPFs and an image to be processed, and the dynamic range is corrected by using the final result of the LPFs. FIG. 9 is a diagram for explaining a dynamic-range correction process performed by the image processing apparatus 10 according to the fourth embodiment.

As illustrated in FIG. 9, the image processing apparatus 10 reduces the N-th frame of the input moving image thereby generating a reduced image, performs smoothing on the generated reduced image of the N-th frame at a plurality of preset level values thereby generating a plurality of smoothed images, synthesizes one or more of the plurality of the generated smoothed images of the N-th frame and the (N+1)-th or later frame of the moving image received from outside thereby generating a composite low-frequency component, and stores the generated composite low-frequency component in a low-frequency-component storage and composite-low-frequency-component generating unit (see (1) in FIG. 9).

To give an example specifically, when a moving image composed of a plurality of frames is input from outside, the image processing apparatus 10 reduces the N-th frame of the input moving image, thereby generating a reduced image. Then, the image processing apparatus 10 performs smoothing corresponding to a plurality of preset level value ranges (gradation levels of 0 to 255 are stratified into multiple ranges) with respect to the generated reduced image of the N-th frame, thereby generating a plurality of smoothed images. Subsequently, the image processing apparatus 10 performs an edge-preserving LPF process by synthesizing one or more of the plurality of the generated smoothed images of the N-th frame and the (N+1)-th frame, an object to be processed, of the moving image received from outside, thereby generating a composite low-frequency component "a", and stores the composite low-frequency component "a" in the low-frequency-component storage and composite-low-frequency-component generating unit.

Namely, using the smoothed images of the reduced N-th frame, the image processing apparatus 10 synthesizes the smoothed image(s) of the reduced N-th frame and the (N+1)-th frame while acquiring detailed information, such as information on the edge that is not held in the smoothed image(s) of the N-th frame, from the (N+1)-th frame to be processed, thereby generating a composite low-frequency component holding edge information.

Then, the image processing apparatus 10 corrects the dynamic range by using the composite low-frequency component stored in the low-frequency-component storage and composite-low-frequency-component generating unit (see (2) in FIG. 9).

To explain specifically with the example described above, the image processing apparatus 10 generates a high-frequency-component "c" from a difference "c=b−a" between the (N+1)-th frame "b", an object to be processed, of the input moving image and the composite low-frequency component "a" stored in the low-frequency-component storage and composite-low-frequency-component generating unit. Then, the image processing apparatus 10 performs a dynamic-range correction process "c×α+a×β" for enhancing the visibility of the moving image by suppressing the composite low-frequency component "a" (a suppression factor: (3) and magnifying the high-frequency component "c" (a magnification factor: α). As for the (N+1)-th and later frames (such as the (N+2)-th frame and the (N+3)-th frame), similarly, using the plurality of the smoothed images of the N-th frame, the image processing apparatus 10 generates a composite low-frequency component by the edge-preserving LPF process, i.e., by synthesizing the smoothed image(s) of the N-th frame and the (N+2)-th frame, the (N+3)-th frame, or the like, and performs the dynamic-range correction process.

Effects of Fourth Embodiment

In this manner, using a result of multilevel LPFs, the image processing apparatus 10 according to the fourth embodiment synthesizes the result of the multilevel LPFs and an image to be processed thereby generating a final result of the LPFs, and corrects the dynamic range by using the final result of the LPFs; thus, it is possible to output an image reproducing the edge accurately.

[e] Fifth Embodiment

The embodiments of the present invention are described above; in addition, the present invention can be implemented in various different forms other than the embodiment described above. Consequently, embodiments of (1) a system configuration, (2) generation of a low-frequency component, and (3) a program are described below.

(1) System Configuration

For example, processing procedures, control procedures, specific names, and information including various data and parameters illustrated in the above specification and the drawings (for example, information on "the low-frequency-component storage unit 11b" illustrated in FIG. 3) can be arbitrarily changed unless otherwise specified.

Furthermore, respective elements of the apparatuses illustrated in the drawings are functionally conceptual ones, and do not always have to be physically configured as illustrated in the drawings. Namely, specific forms of dispersion/integration of the elements in each apparatus are not limited to those illustrated in the drawings, and all or part of them can be configured to be functionally or physically dispersed or integrated in arbitrary units depending on various loads or use conditions; for example, the high-frequency-component generation processing unit 12c-1 and the range correcting unit 12c-2 can be integrated into the dynamic-range correcting unit 12c, and so on. Moreover, all or any part of functions of processing processes performed in each apparatus are each realized by a CPU and a program analyzed and executed by the CPU, or can be realized as hardware by wired logic.

(2) Generation of Low-Frequency Component

Furthermore, in the above first embodiment, it is described that a low-frequency component is generated from one frame, and the dynamic range is corrected by using the generated low-frequency component; however, the present invention is not limited to this, and a low-frequency component can be generated from a plurality of frames, and the dynamic range can be corrected by using the generated low-frequency component.

For example, the image processing apparatus 10 generates a low-frequency component from the N-th frame, the (N+1)-th frame, and the (N+2)-th frame of an input moving image. Then, using the generated low-frequency component, the image processing apparatus 10 performs dynamic-range correction for enhancing the visibility of the moving image by suppressing the low-frequency component and magnifying a high-frequency component. Incidentally, in the case where a low-frequency component is generated from a plurality of frames, a use rate of the frames can be set, for example, at "N:N+1:N+2=5:4:1", or portions acquired from the frames can be sorted by the brightness to be used. As a result, the image processing apparatus 10 holds general information on an image, and the low-frequency component with little significant change is shared among the plurality of the frames; thus, it is possible to minimize the effect on the image quality.

(3) Program

Figure 10:
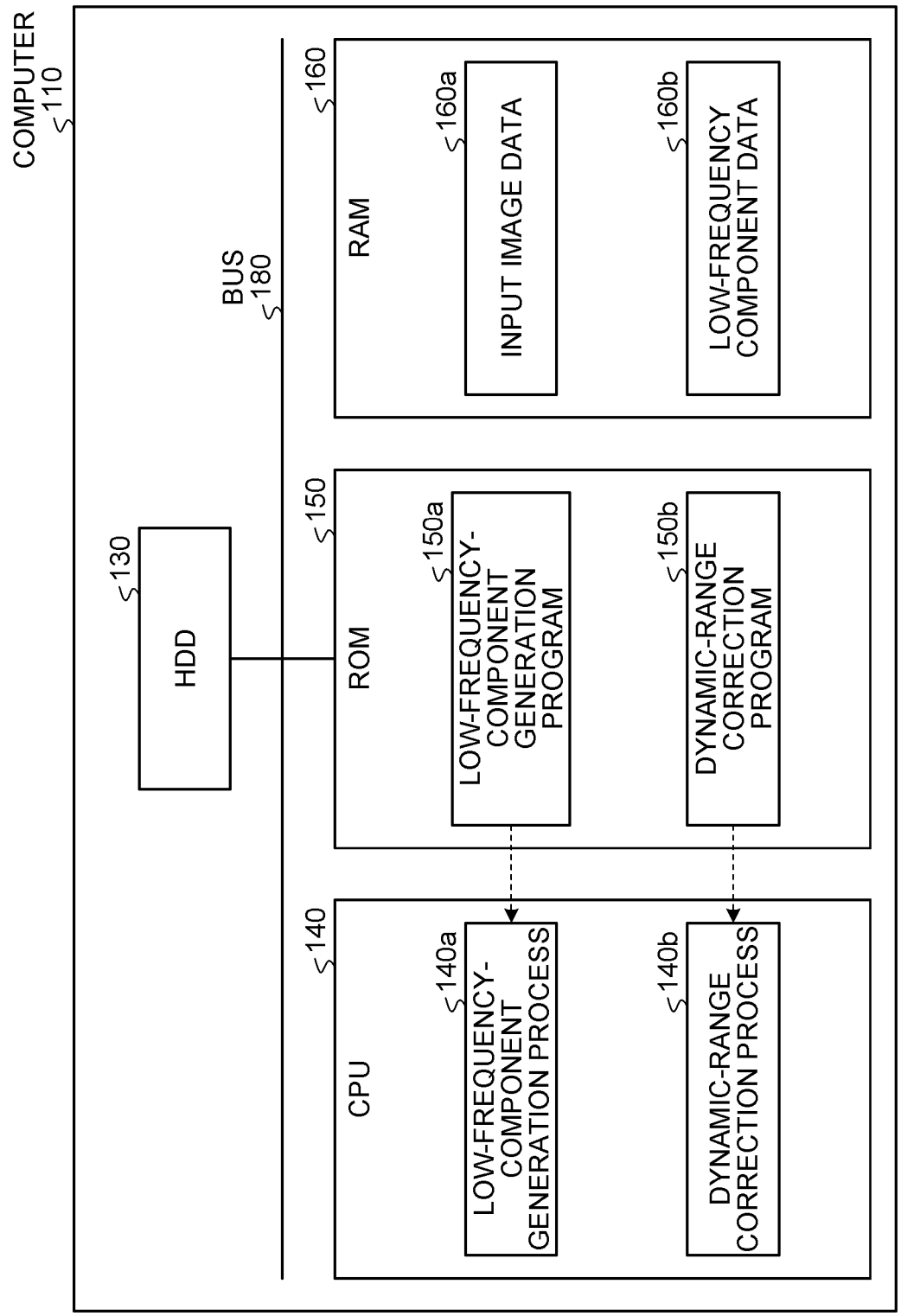
FIG. 10 is a diagram illustrating a computer that execute an image processing program.

The image processing apparatus described in the present embodiment can be realized by causing a computer, such as a personal computer or a workstation, to execute a program prepared in advance. Consequently, in what follows, with reference to FIG. 10, there is described an example of a computer that execute an image processing program having the same functions as the image processing apparatus described in the above embodiment. FIG. 10 is a diagram illustrating the computer that executes the image processing program.

As illustrated in FIG. 10, a computer 110 as the image processing apparatus is composed of a Hard Disk Drive (HDD) 130, a Central Processing Unit (CPU) 140, a Read Only Memory (ROM) 150, and a Random Access Memory (RAM) 160 which are connected to each other by a bus 180 and the like.

In the ROM 150, an image processing program fulfilling the same functions as the image processing apparatus 10 described in the above first embodiment, i.e., as illustrated in FIG. 10, a low-frequency-component generation program 150a and a dynamic-range correction program 150b are stored in advance. Incidentally, these programs 150a and 150b can be arbitrarily integrated or dispersed in the same manner as the elements of the image processing apparatus illustrated in FIG. 3.

The CPU 140 reads out these programs 150a and 150b from the ROM 150, and executes the programs 150a and 150b, whereby, as illustrated in FIG. 10, the programs 150a and 150b serve as a low-frequency-component generation process 140a and a dynamic-range correction process 140b, respectively. Incidentally, the processes 140a and 140b correspond to the low-frequency-component generation processing unit 12b and the dynamic-range correcting unit 12c illustrated in FIG. 3, respectively.

Then, the CPU 140 executes the image processing program on the basis of input image data 160a and low-frequency component data 160b which are recorded on the RAM 160.

Incidentally, the programs 150a and 150b described above do not always have to be stored in the ROM 150 from the start; for example, each program can be stored in "a portable physical medium" to be inserted into the computer 110, such as a flexible disk (FD), a CD-ROM, a DVD, a magneto optical disk, or an IC card, "a fixed physical medium" provided outside or inside of the computer 110, such as an HDD, or "another computer (or a server)" connected to the computer 110 via a public line, the Internet, a LAN, a WAN, or the like, and the computer 110 reads out the program from any of them, and executes the program.

According to an embodiment, it is possible to reduce the processing load, and also possible to prevent the processing delay.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a low-frequency-component storage unit that stores therein a low-frequency component generated from a frame in an input moving image composed of a plurality of frames;
a low-frequency-component generating unit that generates a low-frequency component from an N-th frame of the input moving image, and stores the low-frequency component in the low-frequency-component storage unit; and
a dynamic-range correcting unit that corrects a dynamic range by using an (N+1)-th or later frame of the input moving image and the low-frequency component of the N-th frame stored in the low-frequency-component storage unit.

2. The image processing apparatus according to claim 1, wherein
the low-frequency-component generating unit generates a low-frequency component from a plurality of frames of the input moving image, and stores the low-frequency component in the low-frequency-component storage unit, and
the dynamic-range correcting unit corrects a dynamic range by using a frame of the input moving image, which is an object to be processed, and the low-frequency component stored in the low-frequency-component storage unit.

3. The image processing apparatus according to claim 1, further comprising:
an input-image storage unit that stores therein frames of an input moving image; and
a scene-change detecting unit that compares a frame from which a low-frequency component is generated out of the frames of the input moving image stored in the input-image storage unit with each of subsequent frames stored in the input-image storage unit, which follow the frame from which the low-frequency component is generated, to detect whether there is a scene change between the frames, and if detects a scene change, notifies the low-frequency-component generating unit of the detection of the scene change, wherein
if the scene-change detecting unit detects a scene change, the low-frequency-component generating unit generates a low-frequency component from a frame in which the scene change occurs, and
the dynamic-range correcting unit corrects a dynamic range by using the low-frequency component generated by the low-frequency-component generating unit.

4. The image processing apparatus according to claim 3, wherein
if the number of times of comparison for detection of a scene change exceeds a predetermined given number, the low-frequency-component generating unit generates a low-frequency component from a frame at which the number of times of comparison exceeds the given number even though the low-frequency-component generating unit does not receive a notification of detection of a scene change from the scene-change detecting unit, and
the dynamic-range correcting unit corrects a dynamic range by using the low-frequency component generated by the low-frequency-component generating unit.

5. The image processing apparatus according to claim 1, further comprising:
an input-image storage unit that stores therein frames of an input moving image; and
a scene-change detecting unit that compares a frame from which a low-frequency component is generated out of the frames of the input moving image stored in the input-image storage unit with each of subsequent frames stored in the input-image storage unit, which follow the frame from which the low-frequency component is generated, to detect whether there is a scene change between the frames, and if detects a scene change, notifies the low-frequency-component generating unit of the detection of the scene change, wherein
if the scene-change detecting unit detects a scene change, the low-frequency-component generating unit generates a low-frequency component from a frame in which the scene change occurs, and linearly interpolates using the low-frequency component generated from the frame before the scene change and the low-frequency component generated from the frame in which the scene change occurs thereby generating a low-frequency component of frame(s) up to the scene change, and
the dynamic-range correcting unit corrects a dynamic range by using the low-frequency component generated by the low-frequency-component generating unit.

6. The image processing apparatus according to claim 1, wherein when generating a low-frequency component from a frame of the input moving image, the low-frequency-component generating unit generates the low-frequency component over a period of time in which a predetermined number of frames are received, and stores the low-frequency component in the low-frequency-component storage unit.

7. The image processing apparatus according to claim 1, further comprising an image reduction processing unit that reduces the N-th frame of the input moving image thereby generating a reduced image of the N-th frame, wherein
the low-frequency-component generating unit generates a plurality of smoothed images of the N-th frame by performing smoothing on the reduced image of the N-th frame generated by the image reduction processing unit at a plurality of preset level values, generates a composite low-frequency component by synthesizing one or more of the plurality of the generated smoothed images of the N-th frame and the (N+1)-th or later frame of the moving image received from outside, and stores the composite low-frequency component in the low-frequency-component storage unit, and
the dynamic-range correcting unit corrects a dynamic range by using the composite low-frequency component stored in the low-frequency-component storage unit.

8. An image processing method comprising:
storing a low-frequency component generated from a frame in an input moving image composed of a plurality of frames;
generating a low-frequency component from an N-th frame of the input moving image, to store the low-frequency component; and
correcting a dynamic range by using an (N+1)-th or later frame of the input moving image and the low-frequency component of the N-th frame stored.

9. A non-transitory computer readable storage medium having stored therein an image processing program which causes a computer to execute a process comprising:
storing a low-frequency component generated from a frame in an input moving image composed of a plurality of frames;
generating a low-frequency component from an N-th frame of the input moving image, to store the low-frequency component; and
correcting a dynamic range by using an (N+1)-th or later frame of the input moving image and the low-frequency component of the N-th frame stored.

* * * * *